FIG. I

INVENTOR
ROBERT L. GOLDEN

BY
Cauden & Cauden
HIS ATTORNEYS

Aug. 5, 1969  R. L. GOLDEN  3,459,332
PNEUMATICALLY CONTROLLED DISPENSING APPARATUS
Filed Aug. 16, 1967  3 Sheets-Sheet 2

INVENTOR
ROBERT W. GOLDEN

BY
*Candor & Candor*

HIS ATTORNEYS

Aug. 5, 1969   R. L. GOLDEN   3,459,332
PNEUMATICALLY CONTROLLED DISPENSING APPARATUS
Filed Aug. 16, 1967   3 Sheets-Sheet 3

INVENTOR
ROBERT L. GOLDEN

BY
*Cauden & Cauden*

HIS ATTORNEYS united States Patent Office 3,459,332
Patented Aug. 5, 1969

3,459,332
PNEUMATICALLY CONTROLLED
DISPENSING APPARATUS
Robert L. Golden, Greensburg, Pa., assignor to Robertshaw Controls Company, Richmond, Va., a corporation of Delaware
Filed Aug. 16, 1967, Ser. No. 661,041
Int. Cl. B67d 5/08
U.S. Cl. 222—61                                10 Claims

ABSTRACT OF THE DISCLOSURE

This disclosure relates to a pneumatic control system for dispensing metered quantities of liquid from one or more different liquid supply chambers out through dispensing outlets in an automatic manner so that the dispensed liquids will be in proper quantities for providing a predetermined mixture of liquids or the like each time the dispensing apparatus is operated, each dispensing operation being effected by pneumatically controlled actuator means.

---

This invention relates to a pneumatically controlled dispensing apparatus and to a method for dispensing liquids or the like.

It is well known that many specific liquid mixtures are provided by combining a proper ration of predetermined quantities of different liquids. It is also well known that it is sometimes desired to change the quantity ratio of the liquids for a resulting mixture with that changed mixture to thereafter remain constant in its particular ratio of liquids.

For example, in preparing liquid cooking mixtures, such as salad dressings and the like, providing certain beverages, such as cocktails and the like, as well as in industrial applications, it may be found desirable to provide a liquid dispensing system for providing a specific mixture of two or more liquids during each dispensing operation with the quantity ratio of the particular liquids in the mixture being adapted to be selectively controlled to subsequently maintain a certain changed ratio of the liquids in the mixture dispensed.

Accordingly, it is a feature of this invention to provide pneumatically controlled liquid dispensing apparatus for providing selectively controlled dispensed mixtures and the like.

Therefore, it is an object of this invention to provide a pneumatically controlled dispensing apparatus or the like, the apparatus of this invention having one or more of the novel features set forth above or hereinafter shown or described.

Another object of this invention is to provide an improved method for dispensing liquid or the like.

Other objects, uses and advantages of this invention are apparent from a reading of this description which proceeds with reference to the accompanying drawings forming a part thereof and wherein.

Figure 1:
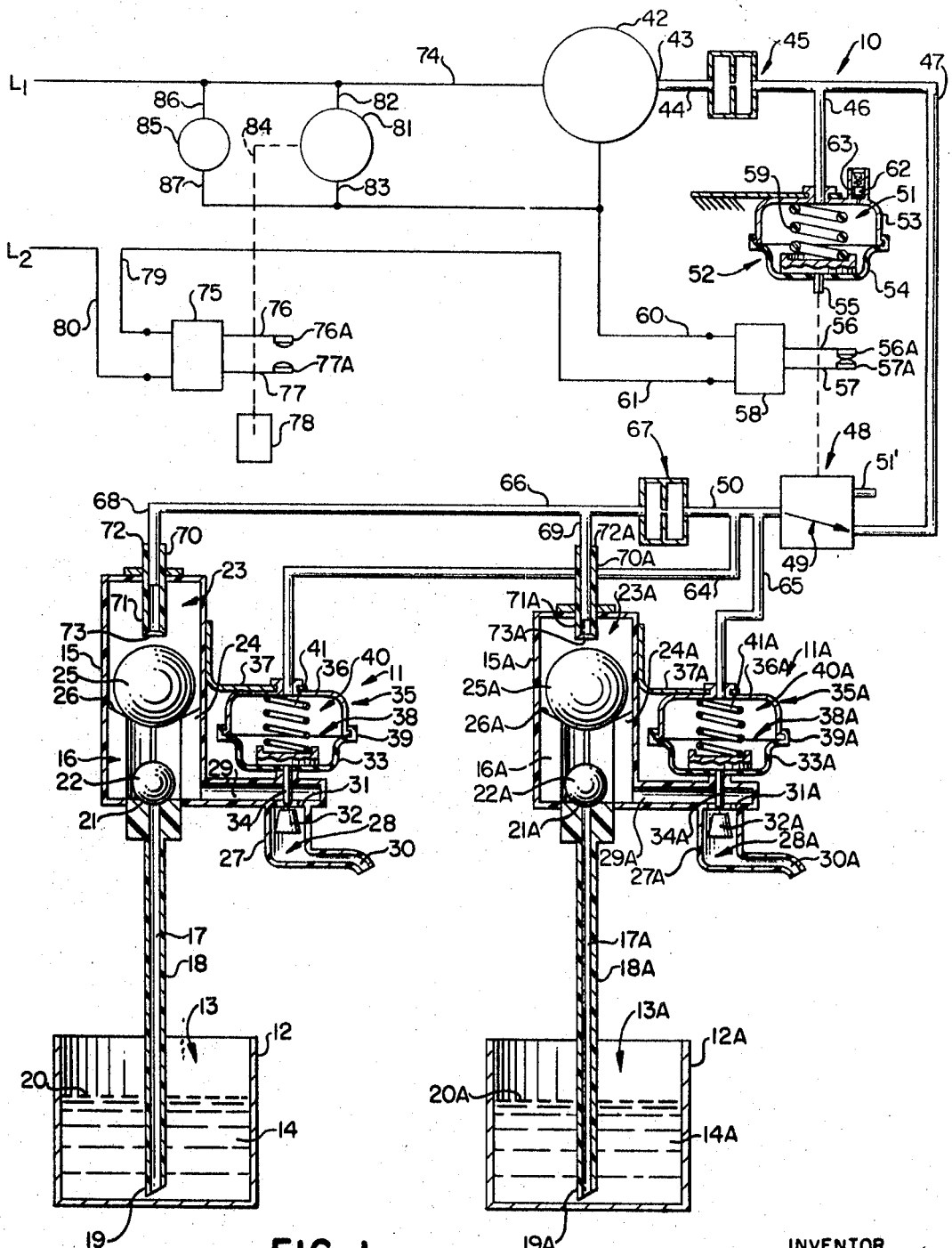
FIGURE 1 is a schematic view illustrating one embodiment of the liquid dispensing apparatus of this invention.

While the various features of this invention are hereinafter described and illustrated as being particularly adaptable to provide automatic control for two or more liquid dispensing units, it is to be understood that the various features of this invention can be utilized singly or in any combination thereof to provide dispensing structure for only a single liquid as desired.

Therefore, this invention is not to be limited to only the embodiments illustrated in the drawings, because the drawings are merely utilized to illustrate some of the wide variety of uses of this invention.

Referring now to FIGURE 1, one embodiment of the liquid dispensing apparatus of this invention is generally indicated by the reference numeral 10 and includes one or more liquid dispensing units generally indicated by the reference numerals 11 and 11A in FIGURE 1. However, since the dispensing units 11 and 11A are identical in construction and operation, only the details of the dispensing unit 11 will be hereinafter set forth with like reference numerals followed by the reference letter A being applied to the unit 11A without specific reference thereto.

In particular, the dispensing unit 11 includes a reservoir or supply container 12 having a supply chamber 13 therein for receiving a supply of a desired liquid 14. Another housing means 15 is provided for the dispennsing unit 11 and has a dispensing chamber 16 therein fluidly interconnected to the supply chamber 13 by a passage means 17 formed through a tubular extension means 18 of the housing means 15, the tubular extension means 18 having its inlet end 18 disposed in the supply chamber 13 well below the level 20 of the liquid 14 and having its outlet end means 21 defining a valve seat means fluidly interconnecting the passage means 17 to the dispensing chamber 16.

The valve seat means 21 is adapted to be opened and closed by a ball check valve member 22 which normally closes the valve seat means 21 by gravity when the dispensing chamber 16 is at atmospheric conditions as will be apparent hereinafter.

The housing means 15 also defines an actuating chamber 23 above the dispensing chamber 16, the actuating chamber being in fluid communication therewith. A plurality of arcuate guide means 24 are disposed in the dispensing chamber 16 of the housing means 15 and permit the ball check valve member 22 to move axially therebetween. The arcuate members 24 support a ball float member 25 on the other beveled end means 26 thereof in spaced relation above the ball check valve member 22 for a purpose hereinafter described, the float valve member 25 being of such a size that the same does not block fluid communication between the actuating chamber 23 and the dispensing chamber 16 in any operating position of the float valve member 25.

The housing means 15 also defines a liquid dispensing spigot construction or nozzle means 27 having a passage means 28 formed therethrough, the passage means 28 having one end 29 disposed in fluid communication with the dispensing chamber 16 and the other end 30 thereof defining the liquid dispensing outlet means for the dispensing unit 11. The spigot construction 27 includes a valve seat 31 in the passage means 28 which is opened and closed by a plug-like valve member 32 disposed on the down-stream side of the valve seat 31 and interconnected to a flexible diaphragm 33 by an actuating post means 34 passing through the valve seat 31.

The flexible diaphragm 33 defines part of a vacuum operated actuator 35 comprising a substantially rigid cup-shaped housing 36 secured to the housing means 15 by suitable bracket means 37 and having its opened end 38 closed by the flexible diaphragm 33 having its outer peripheral portion 39 sealingly secured to the open end 38 of the cup-shaped housing 36 whereby the diaphragm 33 and housing means 36 define a chamber 40 therebetween.

A compression spring 41 is disposed in the chamber 40 of the actuator 35 and tends to move the diaphragm 33 and, thus, the valve member 32 to the position illustrated in FIGURE 1 when the chamber 40 is at atmospheric condition whereby the spigot construction 27 is in its opened and dispensing position. However, when the chamber 40 is evacuated in a manner hereinafter described, the resulting pressure differential across the diaphragm 33 causes the diaphragm 33 to move upwardly in opposition to the force of the compression spring 41 and move the valve member 32 upwardly to close the valve seat 31 in the manner illustrated in FIGURE 2 whereby the spigot construction 27 is closed for a purpose hereinafter described.

The apparatus 10 includes a vacuum pump means 42 having its inlet 43 interconnected to a conduit means 44, the conduit means 44 having a fixed or adjustable orifice means 45 disposed therein intermediate the vacuum pump 42 and a pair of branch conduit means 46 and 47 disposed in fluid communication with the conduit means 44.

The branch conduit means 47 leads to a transfer valve means 48 having a valve member 49 movable in a manner hereinafter described to either fluidly interconnect the branch conduit 47 with a conduit means 50 or to disconnect the branch conduit 47 from the conduit 50 and fluidly interconnect the conduit 50 to a conduit 51' leading to the atmosphere for a purpose hereinafter described.

The branch conduit 46 leads to a chamber 51 of a pneumatically operated actuator 52 formed in a manner similar to the actuator 35 previously described and comprising a cup-shaped housing means 53 carrying a flexible diaphragm 54. The flexible diaphragm 54 has an actuating post means 55 carried thereby and operatively interconnected to the valve 49 of the valve means 48 as well as to contact switch blades 56 and 57 of a relay contact means 58 whereby when the chamber 51 of the actuator 52 is at atmospheric condition as illustrated in FIGURE 1, the position of the diaphragm 54 under the force of a compression spring 59 disposed in the chamber 51 of the actuator 52 holds the valve member 49 to fluidly interconnect the branch conduit 47 to the conduit 50 and maintains the electrical contacts 56A and 57A of the respective contact blades 56 and 57 in electrical contact with each other to electrically interconnect an electrical lead 60 with an electrical lead 61. However, when the chamber 51 of the actuator 52 is evacuated in a manner hereinafter set forth, the pressure differential across the diaphragm 54 causes the diaphragm 54 to move upwardly in FIGURE 1 in opposition to the force of the compression spring 59 and first move the valve member 49 of the valve means 48 to fluidly interconnect the conduit 50 with the conduit 51' leading to the atmosphere while thereafter opening the contacts 56A and 57A to electrically disconnect the leads 60 and 61 from each other.

The chamber 51 of the actuator 53 is fluidly interconnected to the atmosphere by a passage means 62 formed in the housing means 53 and containing a fixed orifice or restriction member 63 that will permit the atmosphere to return to the chamber 51 at a controlled rate that will not prevent the chamber 51 from being evacuated when the branch conduit 46 is interconnected to the vacuum pump 42 to evacuate the chamber 51 in a manner hereinafter described.

A pair of branch conduit means 64 and 65 are respectively disposed in fluid communication with the conduit means 50 and are respectively disposed in fluid communication with the chambers 40 and 40A of the actuators 35 and 35A for the dispensing units 11 and 11A.

The conduit 50 is also disposed in fluid communication with a conduit 66 by means of a fixed or variable orifice or restriction member 67, the conduit 66 being, in turn, disposed in fluid communication with a pair of branch conduits 68 and 69 respectively disposed in fluid communication with the actuating chambers 23 and 23A of the dispensing units 11 and 11A in a manner now to be described.

As illustrated in FIGURE 1, a tubular member 70 is carried by the housing means 15 of the dispensing unit 11 and is axially adjustable relative thereto, such as by being disposed in threaded relation with the housing means 15. The tubular member 70 has one end 71 adapted to be disposed in the actuating chamber 23 and the other end 72 telescopically and sealingly receiving the branch conduit 68. The end 71 of the adjustable tubular member 70 is so constructed and arranged that the same defines a valve seat means 73 fluidly interconnecting the branch conduit 68 with the actuating chamber 23 when the float valve member 25 is in the position illustrated in FIGURE 1 and will be sealed closed by the float member 25 when the same is floated upwardly by the liquid 14 entering the dispensing chamber 16 in a manner hereinafter described to the position illustrated in FIGURE 2 to prevent fluid communication between the branch conduit 68 and the actuating chamber 23.

A pair of power source leads $L^1$ and $L^2$ are provided with lead $L^1$ being interconnected to one side of the vacuum pump 42 by a lead 74, the other side of the vacuum pump 42 being interconnected to the previously described lead 60.

An on-off relay contact means 75 is provided and has a pair of switch blades 76 and 77 carrying electrical contacts 76A and 77A normally being disposed in an opened condition to be moved to a closed position by a push button member 78 in a manner hereinafter described, the switch blades 76 and 77 being respectively electrically interconnected to a pair of leads 79 and 80. The lead 79 is electrically interconnected to the lead 61 while the lead 80 is electrically interconnected to the power source lead $L^2$.

A holding relay coil means 81 electrically placed across leads 74 and 60 by leads 82 and 83 with the relay coil means 81 being operatively interconnected to the push button means 78 by tie means 84 whereby when the push button 78 is moved inwardly to place the contacts 76A and 77A into electrical contact with each other, the holding relay coil means 81 is placed across the power source leads $L^1$ and $L^2$ to be energized, the thus energized coil means 81 holds the push button 78 in its end position until the relay 81 is de-energized in a manner hereinafter set forth by the relay contact means 58 being opened to permit the push button 78 to return to its out position as illustrated in FIGURE 1 by suitable spring means (not shown) and open the contacts 76A and 77A.

The relay coil means 81 and relay contact means 75 and 58 are so constructed and arranged that the vacuum pump 42 can only be energized when the contacts 76A and 77A are placed into electrical contact with each other and, thereafter, the vacuum pump 42 will be de-energized when the contacts 56A and 57A are opened by the actuator 52 as will be apparent hereinafter.

A signal light or indicating means 85 is illustrated as being placed across the leads 74 and 60 by a pair of leads 86 and 87 whereby the indicating means 85 will indicate when the push button 78 has been pushed inwardly to latch the contacts 76A and 77A together by the thus energized relay means 81, the indicating means being de-energized when the relay coil means 81 is de-energized by the opening of the contacts 56A and 57A.

The operation of the dispensing apparatus 10 of this invention will now be described.

The operator of the apparatus 10 first positions the tubular members 70 and 70A of the dispensing units 11 and 11A to the desired setting thereof so that each unit 11 and 11A will dispense a predetermined volumetric quantity of its respective supply liquid 14 and 14A each time the units 11 and 11A are actuated as each quantity of liquid to be dispensed is determined by the liquid level reached in the dispensing chamber to cause the respective float member 25 or 25A to close the valve seat 73 or 73A of its respective tubular member 70 or 70A.

Thereafter, the operator pushes in on the push button 78 to close the contacts 76A and 77A to not only place the vacuum pump 42 across the power source leads $L^1$ and $L^2$, but to also energize the holding coil 81 which maintains the contacts 76A and 77A in contact with each other.

When the vacuum pump 42 is initially energized, the actuator 52 is in the operating position of FIGURE 1 whereby the valve member 49 of the valve means 48 is fluidly interconnecting the branch conduit 47 to the conduit means 50. The actuators 35 and 35A of the dispensing units 11 and 11A are so sized and spring biased relative to the sizing and biasing of the actuator 52 that a relatively low pressure differential across the diaphragms 33 and 33A thereof causes the same to first move upwardly to the position illustrated in FIGURE 2 and close the valve seats 31 and 31A thereof by the valve members 32 and 32A.

Figure 2:
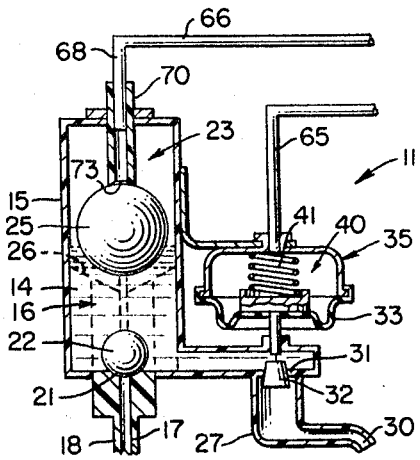
FIGURE 2 is a fragmentary view of one of the dispensing units of FIGURE 1 and illustrates the same in another operating position.

With the valve members 32 and 32A now disposed in their closed positions by the evacuated actuators 35 and 35A, the actuating chambers 23 and 23A are now sealed from the atmosphere and the vacuum pump 42 will begin to evacuate the chambers 23 and 23A whereby atmospheric pressure on the supply liquids 14 and 14A will force the same upwardly through the inlets 19 and 19A of the tube means 18 and 18A past the one-way check ball valve means 22 and 22A to fill the dispensing chambers 16 and 16A in the manner illustrated in FIGURE 2.

As the liquids 14 and 14A are filling the dispensing chambers 16 and 16A, the same begin to float the float ball members 25 and 25A upwardly until the same seat against the valve seat means 73 and 73A of the respective tubular members 70 and 70A to prevent further fluid communication between the actuating chambers 23 and 23A and the inlet 43 of the vacuum pump 42.

Since the volume of air flow in the vacuum conduit 47 is now reduced by the closed tubular members 70 and 70A, the increase in vacuum pressure to the chamber 51 of the actuator 52 causes the resulting pressure differential across the diaphragm 54 to move the diaphragm 54 upwardly from the position illustrated in FIGURE 1 in opposition to the force of the compression spring 59 so that the valve member 49 of the valve means 48 is moved upwardly to disconnect the vacuum conduit 47 from the conduit 50 and place the conduit 50 in fluid communication with the conduit 51' leading to the atmosphere. With the conduit 50 now being interconnected to the atmosphere by the valve means 48, the chambers 40 and 40A of the actuators 35 and 35A return to atmospheric conditions whereby the valve members 32 and 32A are moved to their opened positions so that the liquid in the dispensing chambers 16 and 16A can now flow out of the ends 30 and 30A of the opened spigot constructions 27 and 27A into the desired receptacle to provide a proper mixture of the liquids 14 and 14A as determined by the axial position of the tubular members 70 and 70A previously positioned by the operator or the like. Of course, as atmospheric condition also returns to the actuating chambers 23 and 23A, by the valve means 49, the check valves 22 and 22A prevent the previously transferred liquid into the dispensing chamber 16 and 16A from flowing back to the supply chambers 13 and 13A.

After the valve member 49 of the valve means 48 has been moved to its up position to interconnect the conduit 50 with the conduit 51' in the manner previously described, additional upward travel of the diaphragm 54 of the actuator 52 causes the switch contacts 56A and 57A to open and disconnect the vacuum pump 42 and holding relay coil means 81 from the power source leads $L^1$ and $L^2$ whereby the push button 78 returns to its out position as illustrated in FIGURE 1 to again open the switch contacts 76A and 77A.

Since the vacuum pump 42 is now de-energized, the evacuating chamber 51 of the actuator 52 now receives air from the atmosphere through the passage means 62 at a controlled rate to return the diaphragm 54 to its de-actuated position illustrated in FIGURE 1. However, the controlled rate of air returning to the chamber 51 allows sufficient time for a complete draining of liquid from the dispensing chamber 16 and 16A of the dispensing units 11 and 11A before the contacts 56A and 57A are again placed in electrical contact with each other and the valve member 49 is moved from its up position to the down position illustrated in FIGURE 1 to again interconnect the branch conduit means 47 with the conduit means 50.

Thus, it can be seen that the indicator means 85 will indicate to the operator when the apparatus 10 is latched in by the push button 78 being moved to its on position so that after a dispensing operation and the push button 78 has been returned to its out position as illustrated in FIGURE 1, the indicator means 85 will be de-energized and indicate to the operator that the system is again ready for another dispensing operation in the above manner when the operator again pushes in on the push button 78.

If desired, the orifice or restriction means 45 and 67 may be fixed or adjustable and can be used to calibrate the vacuum system. Also, the means 45 and 67 permit relatively different vacuum pressures to be provided for sequencing the various vacuum operated actuators of the system as vacuum line calibration is necessary to compensate for vacuum line pumps 42 of different capacities or exceptionally long vacuum lines between sections of the system that effect sequencing. The sequencing of the vacuum operated actuators can also be controlled by specification of effective diaphragm areas and compressive spring biasing forces.

Thus, it can be seen that the dispensing apparatus 10 of this invention provides an improved means for pneumatically controlling the same to dispense metered quantities of liquids from one or more dispensing units 11 as desired.

Figure 3:
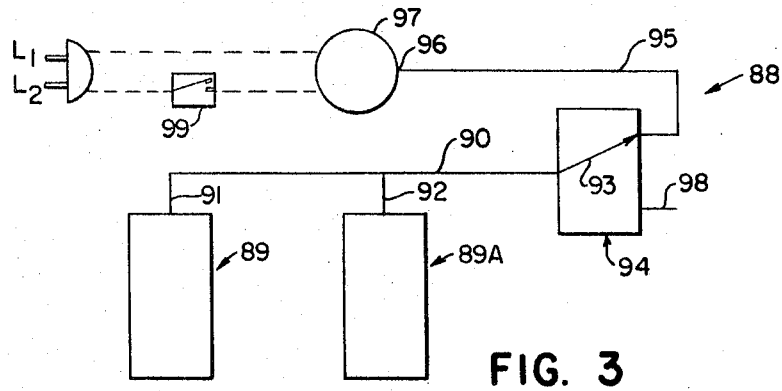
FIGURE 3 is a schematic view illustrating another embodiment of the liquid dispensing apparatus of this invention.

Another dispensing apparatus of this invention is schematically illustrated in FIGURE 3 and is generally indicated by the reference numeral 88. The apparatus 88 includes one or more like dispensing units 89 and in the embodiment illustrated in FIGURE 3 two dispensing units 89 and 89A are schematically illustrated while FIGURES 4 and 5 illustrate the details and operation of the dispensing unit 89 with the understanding that such details apply to the dispensing unit 89A.

As illustrated in FIGURE 3, the dispensing units 89 and 89A are respectively fluidly interconnected to a conduit means 90 by branch conduits 91 and 92, the conduit means 90 being fluidly interconnected to a valve member 93 of a valve means 94 similar to the valve means 48 previously described whereby when the valve member 93, either manually or automatically, is moved to the position illustrated in FIGURE 3, the valve member 93 fluidly interconnects the conduit 90 with a conduit 95 leading to an inlet 96 of a vacuum pump 97. Conversely, when the valve member 93, either manually or automatically, is moved downwardly from the position illustrated in FIGURE 3, the valve member 93 disconnects the conduit 90 from the vacuum source conduit 95 and places the same in fluid communication with a conduit 98 leading to the atmosphere for a purpose hereinafter described.

The vacuum pump 97 is adapted to be placed across power source leads $L^1$ and $L^2$ by a manually operated switch means 99 whereby when the switch means 99 is in its closed position the vacuum pump means 97 will be energized.

Figure 5:
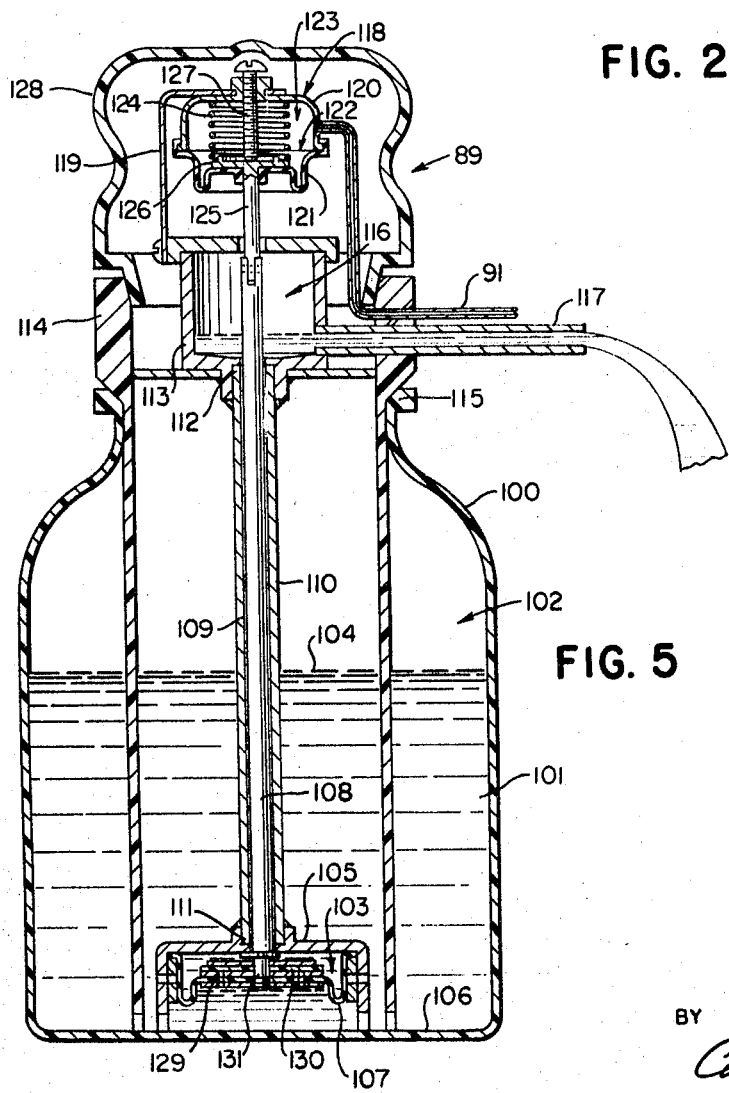
FIGURE 5 is a view similar to FIGURE 4 and illustrates the dispensing unit of FIGURE 4 in another operating position thereof.
Figure 4:
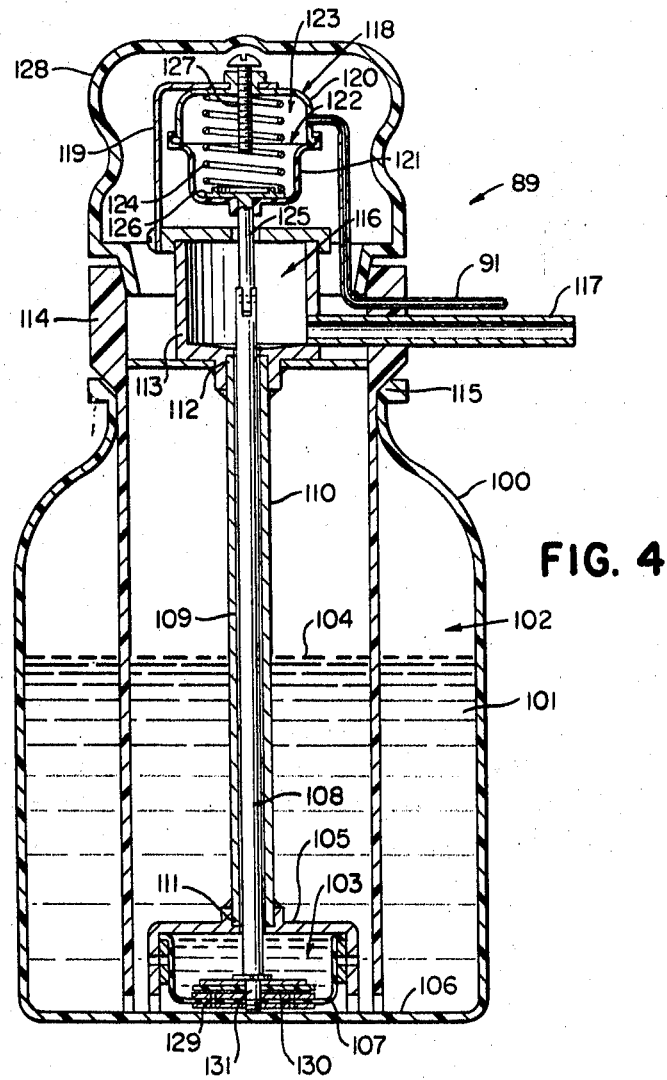
FIGURE 4 is an enlarged, fragmentary cross-sectional view illustrating one of the dispensing units of the apparatus of FIGURE 3.

Each dispensing unit 89, as illustrated in FIGURES 4 and 5 comprises a supply container 100 containing a supply of a desired liquid 101 in a supply chamber 102 thereof. A pumping chamber 103 is formed in the container 100 below the level 104 of the supply liquid 101 and is defined by a cup-shaped housing member 105 supported against the bottom wall 106 of the container 100 and carrying a flexible diaphragm 107. The flexible diaphragm 107 is attached to a rod means 108 passing upwardly through a passage means 109 in a tubular member 110 having one end 111 secured to the housing member 105 and disposed in fluid communication with the pumping chamber 103. The other end 112 of the tubular member 110 is secured to another housing structure 113 carried by a cylindrical member 114 telescopically disposed in the open end 115 of the container 100 and resting against the bottom wall 106 thereof as illustrated. The housing means 113 defines a dispensing chamber 116 disposed in fluid communication with the passage means 109 of the tubular member 110 and is also disposed in fluid communication with a dispensing spout 117 of the housing means 113.

A vacuum operated actuator 118 is carried by a bracket means 119 secured to the housing means 113 and comprises a rigid cup-shaped housing member 120 carrying a flexible diaphragm 121 to close the open end 122 thereof and provide a chamber 123 therebetween that is fluidly interconnected to the branch conduit 91 previously described. A compression spring 124 is disposed in the chamber 123 of the actuator 118 and normally biases the diaphragm 121 to the position illustrated in FIGURE 4 when the chamber 123 is at atmospheric conditions.

The diaphragm 121 of the actuator 118 is interconnected to the rod 108 by an actuating post means 125 whereby the rod 109 is axially moved in the tubular member 110 by the up and down movement of the diaphragm 121 in a manner hereinafter described.

The actuating post 125 of the actuator 118 is interconnected to a rigid backup plate means 126 disposed against the inside surface of the diaphragm 121 and is adapted to abut against an adjustable stop member 127 carried by the housing means 120 when the diaphragm 121 is moved upwardly to the position illustrated in FIGURE 5 upon evacuation of the chamber 123. For example, the adjustable member 127 can be threaded to the housing member 120 as illustrated whereby the operator or the like can adjust the member 127 axially relative to the housing means 120 to predetermine the maximum up position that the diaphragm 121 will move to when the chamber 123 is evacuated and, thus, the position that the rod 108 and diaphragm 107 will be moved upwardly to for a dispensing operation in the manner hereinafter described. If desired, a suitable cap means 128 can be disposed over the cylindrical member 114 to cover the actuator means 118 as illustrated.

The flexible diaphragm 107 has one or more openings 129 passing therethrough to fluidly interconnect the supply chamber 102 with the pumping chamber 103. However, a resilient valve member 130 is loosely carried on the end 131 of the rod 108 to open and close the passage means 129 in a manner hereinafter described.

The operation of the dispensing apparatus 88 will now be described.

Before initiating a dispensing cycle of the apparatus 88, the operator or the like adjusts the stop means 127 of the various dispensing units 89 and 89A to pre- selected positions so that each unit 89 and 89A will dispense a predetermined volumetric quantity of its respective supply liquid during each dispensing cycle as will be apparent hereinafter.

Thereafter, the operator closes the switch 99 and moves the valve member 93 of the valve means 94, either manually or automatically, to its up or dispensing position as illustrated in FIGURE 3 to fluidly interconnect the conduit 90 with the vacuum source conduit 95. With the conduit 90 now being interconnected to the inlet 96 of the energized vacuum pump 97, the chambers 123 of the actuators 118 are evacuated so that the resulting pressure differentials across the diaphragms 121 move the same upwardly in opposition to the force of the compression springs 124 until the backup plates 126 are disposed against the stop means 127 in the manner illustrated in FIGURE 5.

During such upward movement of the diaphragms 121 it can be seen that the liquid in the pumping chamber 103 of the respective unit 89 is forced upwardly through the passage means 109 into the dispensing chamber 116 because the upward movement of the diaphragm 107 causes the valve member 130 to close the passage means 129 to disconnect the pumping chamber 103 from the supply chamber 102. The liquid 101 being pumped out of the chamber 103 by the upwardly moving diaphragm 121 of the actuated actuator 118 of the dispensing unit 89 is transferred into the dispensing chamber 116 to flow out of the spout 117 in the manner illustrated in FIGURE 5 whereby the amount of upward movement of the diaphragm 121 of the actuator 118 determines the amount of liquid being dispensed by the particular unit 89.

After the actuators 118 of the units 89 and 89A have dispensed their predetermined quantity of liquid in the manner illustrated in FIGURE 5, the operator, either manually or automatically, moves the valve member 93 of the valve means 94 downwardly to disconnect the vacuum source conduit 95 from the conduit 90 and place the conduit 90 in fluid communication with the conduit 98 leading to the atmosphere whereby the evacuated chambers 123 of the actuators 118 are again returned to atmospheric conditions so that the compression springs 124 can move the diaphragms 121 thereof downwardly to the position illustrated in FIGURE 4. This downward movement of the diaphragms 121 causes the pumping diaphragms 107 to move downwardly and increase the volumetric capacity of the pumping chambers 103 whereby the force or head of the supply liquid 101 in the supply chamber 103 causes the supply liquid 101 to enter into the pumping chambers 103 through the passage means 129 and check valve means 130 to again fill the pumping chambers 103.

Thereafter, the operator again moves the valve member 93 of the valve means 94 upwardly to fluidly interconnect the conduit 90 with the vacuum source conduit 95 to provide a dispensing operation when desired in the manner previously described.

If desired, the clearance between the outside diameter of the rod 108 and inside diameter of the tube 109 can be held to a minimum to reduce inaccuracy in the dispensed quantity of liquid from the unit 89 that might be caused by changes in liquid level in the supply chamber 102. Of course, the liquid level 104 of the liquid 101 must remain above the upper surface of the housing member 105 to assure full measure dispensing.

Therefore, it can be seen that this invention provides means for liquid dispensing that permits flexibility in the location of components, such as the location of the dispensing units with respect to each other and to the vacuum source means 97 while providing an accurate and pneumatically actuated, adjustable dispensing or blending means.

Accordingly, not only does this invention provide improved liquid dispensing apparatus or the like, but also this invention provides improved methods for dispensing liquids or the like.

While the form of the invention now preferred has been disclosed as required by the statutes, other forms may be used and will come within the scope of the claims which follow.

What is claimed is:

1. Liquid dispensing apparatus comprising means defining a liquid supply chamber, means defining a liquid dispensing chamber operatively interconnected to said supply chamber to receive a particular quantity of liquid, and pneumatically operated means for effecting the transfer of said quantity of liquid from said supply chamber to said dispensing thereof, said last-named means including means for selectively predetermining the volumetric amount of said particular quantity of liquid wherein said dispensing chamber being defined in part by means defining an actuating chamber that comprises said pneumatically operated means, said actuating chamber and said dispensing chamber being fluidly interconnected together, a vacuum source, and passage means for interconnecting said vacuum source to said actuating chamber to effect said transfer.

2. Liquid dispensing apparatus as set forth in claim 1 wherein said actuator has a movable member that is moved against a stop means of said actuator when said actuator is interconnected to said vacuum source, said stop means being adjustable relative to said movable member and comprising said selectively predetermining means.

3. Liquid dispensing apparatus as set forth in claim 1 wherein said dispensing chamber has an outlet means for dispensing said quantity of liquid to the exterior of said apparatus, and means for opening and closing said outlet means.

4. Liquid dispensing apparatus as set forth in claim 3 wherein said opening and closing means for said outlet means includes a pneumatically operated actuator.

5. Liquid dispensing apparatus as set forth in claim 1 and including a first one-way valve means disposed between said supply chamber and said dispensing chamber and interconnecting said dispensing and supply chambers together, and a second one-way valve means disposed between said dispensing chamber and said actuating chamber and interconnecting said dispensing and actuating chamber together.

6. Liquid dispensing apparatus as set forth in claim 5 wherein said second one-way valve means includes a valve seat and a valve member for opening and closing said valve seat, said valve member floating toward said valve seat as said quantity of liquid enters said dispensing chamber and floating away from said valve seat as said liquid is dispensed from said dispensing chamber.

7. Liquid dispensing apparatus as set forth in claim 6 wherein said valve seat is adjustable and comprises said means that interconnects said vacuum source to said actuating chamber, said adjustable valve seat also comprising said means for selecting said predetermined volumetric amount of said liquid.

8. Liquid dispensing apparatus as set forth in claim 1 wherein another liquid dispensing apparatus is provided in combination with said first-named liquid dispensing apparatus, said pneumatically operated means effecting said transfer from both supply chambers to their respective dispensing chambers.

9. Liquid dispensing apparatus as set forth in claim 8 wherein said selectively predetermining means can respectively determine different volumetric amounts for said two liquid dispensing apparatus.

10. Liquid dispensing apparatus as set forth in claim 8 wherein said pneumatically operated means comprises vacuum operated actuator means.

References Cited
UNITED STATES PATENTS

| | | | |
|---|---|---|---|
| 2,205,875 | 6/1940 | Coffey et al. | 222—309 |
| 2,567,683 | 9/1951 | Tamminga | 222—309 |
| 3,101,159 | 8/1963 | Fletcher | 222—70 |
| 3,223,285 | 12/1965 | Anderson | 222—504 |
| 3,227,325 | 1/1966 | Bates | 222—309 |

WALTER SOBIN, Primary Examiner

U.S. Cl. X.R.

222—68, 136, 425, 439, 440, 442, 504